US012286930B1

(12) United States Patent
Heeter et al.

(10) Patent No.: US 12,286,930 B1
(45) Date of Patent: Apr. 29, 2025

(54) TURBINE ENGINE FAN CASE WITH BLEED AIR FOR TIP INJECTION AND HEAT EXCHANGER COOLING

(71) Applicants: Rolls-Royce North American Technologies Inc., Indianapolis, IN (US); Rolls-Royce Corporation, Indianapolis, IN (US)

(72) Inventors: Robert W. Heeter, Indianapolis, IN (US); Jonathan M. Rivers, Indianapolis, IN (US); Daniel E. Molnar, Jr., Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/537,256

(22) Filed: Dec. 12, 2023

(51) Int. Cl.
*F02C 7/18* (2006.01)
*F02C 9/18* (2006.01)
*F04D 29/52* (2006.01)
*F04D 29/58* (2006.01)

(52) U.S. Cl.
CPC .............. *F02C 7/185* (2013.01); *F02C 9/18* (2013.01); *F04D 29/522* (2013.01); *F04D 29/5826* (2013.01); *F05D 2220/36* (2013.01); *F05D 2260/213* (2013.01); *F05D 2260/606* (2013.01)

(58) Field of Classification Search
CPC .... F02C 7/185; F02C 7/18; F02C 9/18; F04D 29/52; F04D 29/522; F04D 29/58; F04D 29/526; F05D 2220/36; F05D 2260/213; F05D 2260/606
See application file for complete search history.

(56) References Cited

U.S. PATENT DOCUMENTS

| 3,572,960 | A | * | 3/1971 | McBride | ............... F04D 29/684 415/209.1 |
| 5,203,163 | A | | 4/1993 | Parsons | |
| 6,574,965 | B1 | | 6/2003 | Feulner | |
| 7,631,483 | B2 | * | 12/2009 | Mani | ..................... F02C 7/045 60/785 |
| 7,870,721 | B2 | * | 1/2011 | Winter | ................. F04D 29/684 137/15.1 |
| 8,234,869 | B2 | * | 8/2012 | Tuan | ..................... F02C 7/042 60/725 |
| 8,266,889 | B2 | | 9/2012 | Coffinberry | |
| 8,529,189 | B2 | | 9/2013 | Brown et al. | |
| 8,683,811 | B2 | | 4/2014 | Clemen et al. | |
| 8,961,114 | B2 | | 2/2015 | Ruthemeyer | |
| 9,879,610 | B2 | | 1/2018 | Moes | |
| 9,932,905 | B2 | | 4/2018 | Suciu et al. | |
| 10,400,675 | B2 | | 9/2019 | Sennoun et al. | |

(Continued)

FOREIGN PATENT DOCUMENTS

GB 2524229 A * 9/2015 ........... F01D 21/045

*Primary Examiner* — Woody A Lee, Jr.
*Assistant Examiner* — Joshua R Beebe
(74) *Attorney, Agent, or Firm* — Barnes & Thornburg

(57) ABSTRACT

A fan case assembly adapted for use with a gas turbine engine includes a fan casing and a bleed air flow control system. The fan casing includes an annular case and a fan track liner coupled with the annular case. The bleed air flow control system is configured to bleed selectively a portion of air flowing through a gas path of the fan case assembly for use as a cooling source in the fan case assembly.

19 Claims, 5 Drawing Sheets

(56) References Cited

U.S. PATENT DOCUMENTS

| | | | |
|---|---|---|---|
| 11,187,156 B2 | 11/2021 | Niergarth et al. | |
| 11,702,945 B2 | 7/2023 | Heeter et al. | |
| 11,702,985 B1 | 7/2023 | Miller et al. | |
| 2005/0271503 A1* | 12/2005 | Harper | F01D 21/045 |
| | | | 415/170.1 |
| 2009/0000272 A1* | 1/2009 | Cloft | F02C 9/18 |
| | | | 60/226.1 |
| 2014/0369812 A1* | 12/2014 | Caruel | F02C 7/12 |
| | | | 415/116 |
| 2015/0121842 A1* | 5/2015 | Moes | F02C 6/08 |
| | | | 60/225 |
| 2020/0386107 A1* | 12/2020 | Hoisington | F01D 9/04 |
| 2021/0348564 A1* | 11/2021 | Mackin | F02C 7/047 |
| 2023/0193778 A1 | 6/2023 | Heeter et al. | |

* cited by examiner

TURBINE ENGINE FAN CASE WITH BLEED AIR FOR TIP INJECTION AND HEAT EXCHANGER COOLING

FIELD OF THE DISCLOSURE

The present disclosure relates generally to gas turbine engines, and more specifically to fan case assemblies for gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Leftover products of the combustion are exhausted out of the turbine and may provide thrust in some applications.

Gas turbine engines also typically include a fan assembly that includes rotating blades that force air into the compressor section of the engine, as well as potentially providing additional thrust via forcing air around the engine core through bypass ducts. Bleed air bled from bypass ducts may be used as a cooling source within gas turbine engines. However, limited space within bypass ducts may make it difficult to incorporate features into bypass ducts that utilize the bleed air as a cooling source.

SUMMARY

The present disclosure may comprise one or more of the following features and combinations thereof.

A fan case assembly adapted for use with a gas turbine engine may comprise a fan casing and a bleed air flow control system. The fan casing may be configured to be arranged around fan blades. The fan casing may define a gas path through the fan case assembly. The fan casing may include a metallic annular case that extends circumferentially about a central axis and a fan track liner coupled with the metallic annular case. The fan track liner may be configured to interface with the fan blades. The fan track liner may include a forward end, an aft end spaced apart axially from the forward end, and an inner radial surface that extends between the forward end and the aft end to define an outer boundary of the gas path.

In some embodiments, the bleed air flow control system may be configured to bleed selectively a portion of air flowing through the gas path for use as a cooling source in the fan case assembly. The bleed air flow control system may include an air recirculation duct and a heat exchanger duct. The air recirculation duct may conduct the portion of the air from the gas path at the aft end of the fan track liner and direct the portion of the air into the gas path at the forward end of the fan track liner. The heat exchanger duct may include a cooling fluid passage in fluid communication with the air recirculation duct and a heat exchanger in fluid communication with the cooling fluid passage.

In some embodiments, the cooling fluid passage may be configured to conduct the portion of the air through the heat exchanger to transmit heat from the heat exchanger to the portion of the air and to direct the portion of the air into the gas path after conducting the portion of the air through the heat exchanger. In a first mode, the bleed air flow control system may direct the portion of the air into the gas path axially forward of the forward end of the fan track liner without directing the portion of the air through the heat exchanger. In a second mode, the bleed air flow control system may direct the portion of the air through the heat exchanger without directing the portion of the air into the gas path axially forward of the forward end of the fan track liner.

In some embodiments, the bleed air flow control system may include a controller configured to operate the bleed air flow control system in the first mode or in the second mode depending on an operating condition of the gas turbine engine. The air recirculation duct may include an extraction port in fluid communication with the gas path aft of the aft end of the fan track liner and an injection port in fluid communication with the gas path forward of the forward end of the fan track liner. The cooling fluid passage of the heat exchanger duct may include an inlet in fluid communication with the air recirculation duct to receive the portion of the air therefrom and an outlet in fluid communication with the gas path aft of the extraction port of the air recirculation duct.

In some embodiments, the extraction port may extend radially through the annular case at a location axially aft of the aft end of the fan track liner. The air recirculation duct may extend axially forward from the extraction port toward the forward end of the fan track liner. The injection port may extend radially inward from the air recirculation duct through the annular case at a location axially forward of the forward end of the fan track liner.

In some embodiments, the bleed air flow control system may include a first valve coupled with the air recirculation duct and configured to selectively open and close to allow and block the portion of the air through the air recirculation duct to the gas path forward of the forward end of the fan track liner. The bleed air flow control system may include a second valve coupled with the cooling fluid passage and configured to selectively open and close to allow and block the portion of the air through the cooling fluid passage to the heat exchanger.

In some embodiments, the air recirculation duct and the heat exchanger duct may be located radially outward of an outer wall of the metallic annular case. The bleed air flow control system may include a second air recirculation duct and a second cooling fluid passage. The second air recirculation duct may be circumferentially spaced apart from the air recirculation duct and the second cooling fluid passage may be in fluid communication with each of the second air recirculation duct and the heat exchanger to transmit another portion of air from the gas path to the heat exchanger.

In some embodiments, the bleed air flow control system may include a three-way valve coupled with the air recirculation duct and the cooling fluid passage and configured to selectively allow and block the portion of the air through the air recirculation duct to the gas path and through the cooling fluid passage to the heat exchanger. An outer wall of the annular case may have an outer radial surface and the air recirculation duct and the heat exchanger duct may be located radially outward of the outer wall such that the portion of the air flowing through the air recirculation duct and the heat exchanger duct may not exposed to the outer radial surface of the outer wall.

According to another aspect of the present disclosure, a fan case assembly adapted for use with a gas turbine engine may comprise a fan casing and a bleed air flow control system. The fan casing may define a gas path through the fan case assembly. The fan casing may include an annular case that extends circumferentially about a central axis and a fan track liner coupled with the annular case. The fan track liner may include a forward end and an aft end spaced apart axially from the forward end. The bleed air flow control system may be configured to bleed selectively a portion of air flowing through the gas path. The bleed air flow control system may include an air recirculation duct and a heat exchanger duct. The air recirculation duct may conduct the portion of the air from the gas path at the aft end of the fan track liner and direct the portion of the air into the gas path at the forward end of the fan track liner. The heat exchanger duct may include a cooling fluid passage in fluid communication with the air recirculation duct to receive the portion of the air therefrom and a heat exchanger in fluid communication with the cooling fluid passage.

In some embodiments, in a first mode, the bleed air flow control system may direct the portion of the air into the gas path axially forward of the forward end of the fan track liner without directing the portion of the air through the heat exchanger. In a second mode, the bleed air flow control system may direct the portion of the air through the heat exchanger without directing the portion of the air into the gas path axially forward of the forward end of the fan track liner.

In some embodiments, the bleed air flow control system may include a controller configured to operate the bleed air flow control system in the first mode or in the second mode depending on an operating condition of the gas turbine engine. The air recirculation duct may include an extraction port in fluid communication with the gas path aft of the aft end of the fan track liner and an injection port in fluid communication with the gas path forward of the forward end of the fan track liner. The cooling fluid passage of the heat exchanger duct may include an inlet in fluid communication with the air recirculation duct to receive the portion of the air therefrom and an outlet in fluid communication with the gas path aft of the extraction port of the air recirculation duct.

In some embodiments, the bleed air flow control system may include a first valve coupled with the air recirculation duct and a second valve coupled with the cooling fluid passage. The first valve may be configured to selectively open and close to allow and block the portion of the air through the air recirculation duct to the gas path forward of the forward end of the fan track liner. The second valve may be configured to selectively open and close to allow and block the portion of the air through the cooling fluid passage to the heat exchanger.

In some embodiments, the bleed air flow control system may include a three-way valve coupled with the air recirculation duct and the cooling fluid passage and configured to selectively allow and block the portion of the air through the air recirculation duct to the gas path and through the cooling fluid passage to the heat exchanger.

A method may comprise providing a fan casing that defines a gas path. The fan casing may include an annular case that extends around a central axis and a fan track liner coupled with the annular case. The method may include arranging a bleed air flow control system radially outward of the annular case. The bleed air flow control system may include an air recirculation duct, a cooling fluid passage, and a heat exchanger.

In some embodiments, the method may include extending an extraction port of the air recirculation duct radially inward through an outer wall of the annular case axially aft of an aft end of the fan track liner. The method may include extending an injection port of the air recirculation duct radially inward through the outer wall of the annular case axially forward of a forward end of the fan track liner. The method may include coupling an inlet of the cooling fluid passage with the air recirculation duct.

In some embodiments, the method may include coupling the heat exchanger with the cooling fluid passage so that the heat exchanger and the cooling fluid passage are in fluid communication with one another. The method may include extending an outlet of the cooling fluid passage radially inward through the outer wall of the annular case axially aft of the extraction port of the air recirculation duct.

In some embodiments, the method may include, in response to a first operating condition, opening a first valve coupled with the air recirculation duct, closing a second valve coupled with the cooling fluid passage, and flowing a portion of air from the gas path through the air recirculation duct from the extraction port to the injection port. The method may include, in response to a second operating condition, closing the first valve, opening the second valve, and flowing the portion of the air through the cooling fluid passage to the heat exchanger.

These and other features of the present disclosure will become more apparent from the following description of the illustrative embodiments.

DETAILED DESCRIPTION OF THE DRAWINGS

Figure 1:
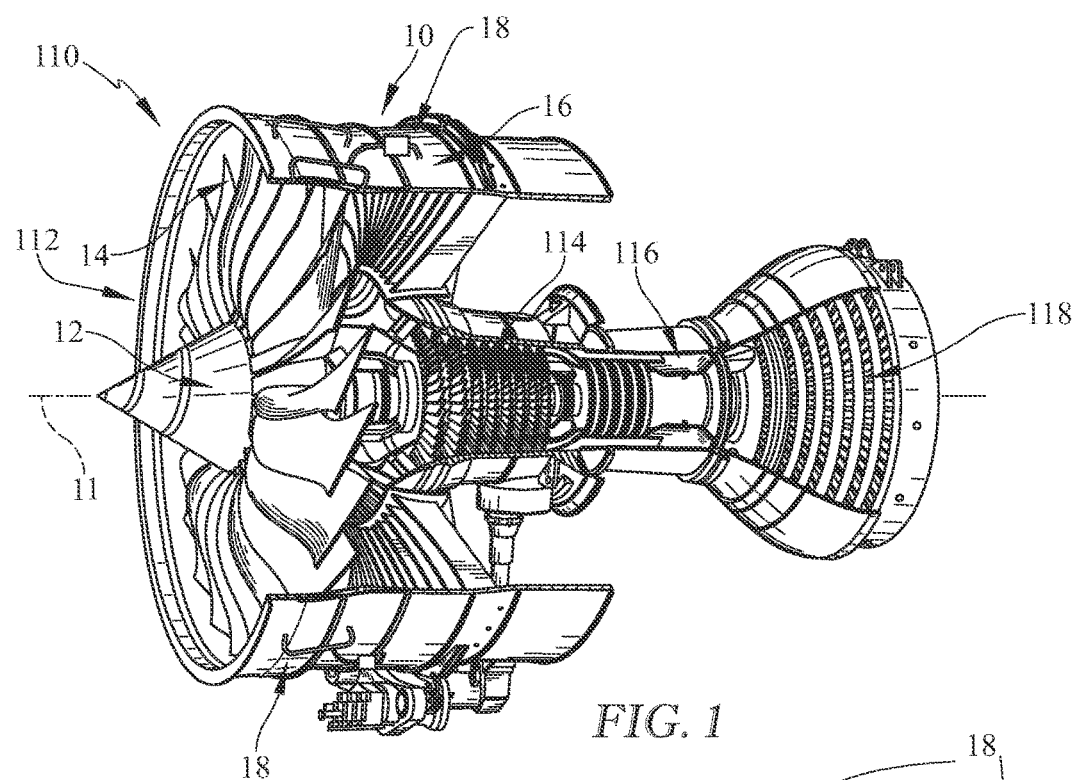
FIG. 1 is a cutaway perspective view of a gas turbine engine that includes a fan, a compressor, a combustor, and a turbine, the fan including a fan rotor configured to rotate about an axis of the engine and a fan case assembly that surrounds fan blades included in the fan rotor, and further showing that the fan case assembly includes a fan casing arranged around the fan blades to define a gas path and a bleed air flow control system located radially outward of and extending through the fan casing, the flow control system configured to bleed selectively a portion of air flowing through the gas path for use as a cooling source in the fan case assembly and for stall margin improvement.

For the purposes of promoting an understanding of the principles of the disclosure, reference will now be made to a number of illustrative embodiments illustrated in the drawings and specific language will be used to describe the same.

An illustrative gas turbine engine 110 includes a fan 112, a compressor 114, a combustor 116, and a turbine 118 as shown in FIG. 1. The fan 112 is driven by the turbine 118 and provides thrust for propelling an air vehicle. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about a central axis 11 of the gas turbine engine 110 and drive the compressor 114 and the fan 112.

Figure 2:
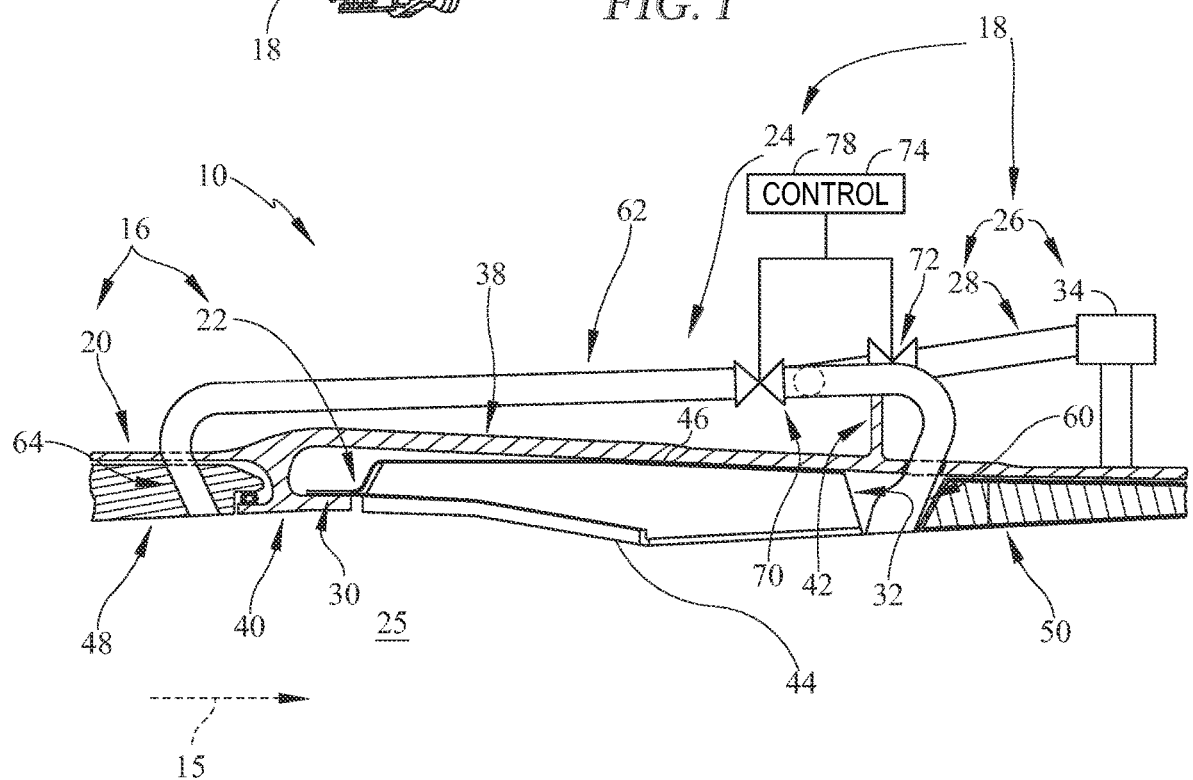
FIG. 2 is a perspective view of the fan case assembly of FIG. 1 showing that the fan casing includes an annular case and a fan track liner coupled with the annular case, and the bleed air flow control system includes an air recirculation duct in fluid communication with the gas path and a heat exchanger duct in fluid communication with the air recirculation duct, the air recirculation duct directs the portion of the air flowing through the gas path from an aft end of the fan track liner into the gas path axially forward of a forward end of the fan track liner and the heat exchanger duct includes a cooling fluid passage that directs the portion of the air through a heat exchanger and into the gas path.

The fan 112 includes a fan case assembly 10 and a fan rotor 12 as shown in FIG. 1. The fan rotor 12 has a number of fan blades 14 that extend radially outward relative to the central axis 11. The fan case assembly 10 extends circumferentially around the fan blades 14. The fan case assembly 10 includes, among other components, a fan casing 16 and a bleed air flow control system 18 as shown in FIG. 2. The fan casing 16 is arranged around the fan blades 14 to define a gas path 25 through the fan case assembly 10. The bleed air flow control system 18 is configured to bleed selectively a portion of air 15 flowing through the gas path 25 for use as a cooling source in the fan case assembly 10 and/or for stall margin improvement.

Figure 4:
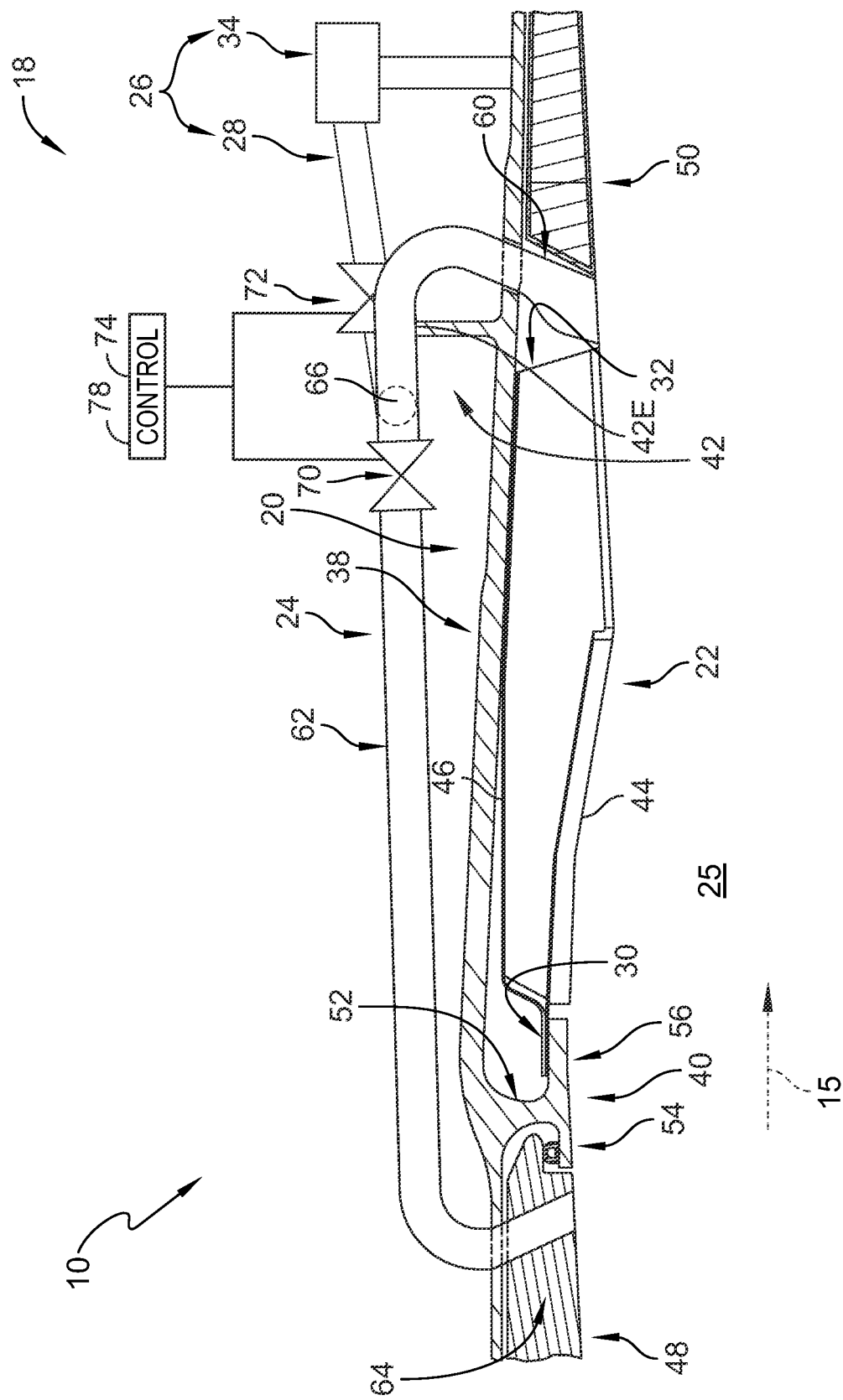
FIG. 4 is an enlarged view of FIG. 2 showing that the bleed air flow control system is located radially outward of the annular case, the extraction port of the air recirculation duct is in fluid communication with the gas path and extends radially through the annular case axially aft of the aft end of the fan track liner, the injection port of the air recirculation duct is in fluid communication with the gas path and extends radially through the annular case axially forward of the forward end of the fan track liner, and an outlet of the cooling fluid passage extends radially through the annular case axially aft of the extraction port.

The fan casing 16 includes an annular case 20 and a fan track liner 22 as shown in FIGS. 2 and 4. The annular case 20 extends circumferentially about the central axis 11 and is configured to support the fan track liner 22 at a radial position relative to the central axis 11. The fan track liner 22 extends circumferentially at least partway about the central axis 11 radially inward of the annular case 20. The fan track liner 22 is coupled with the annular case 20 to interface with the fan blades 14. The fan blades 14 are spaced apart from the fan track liner 22.

Figure 3:
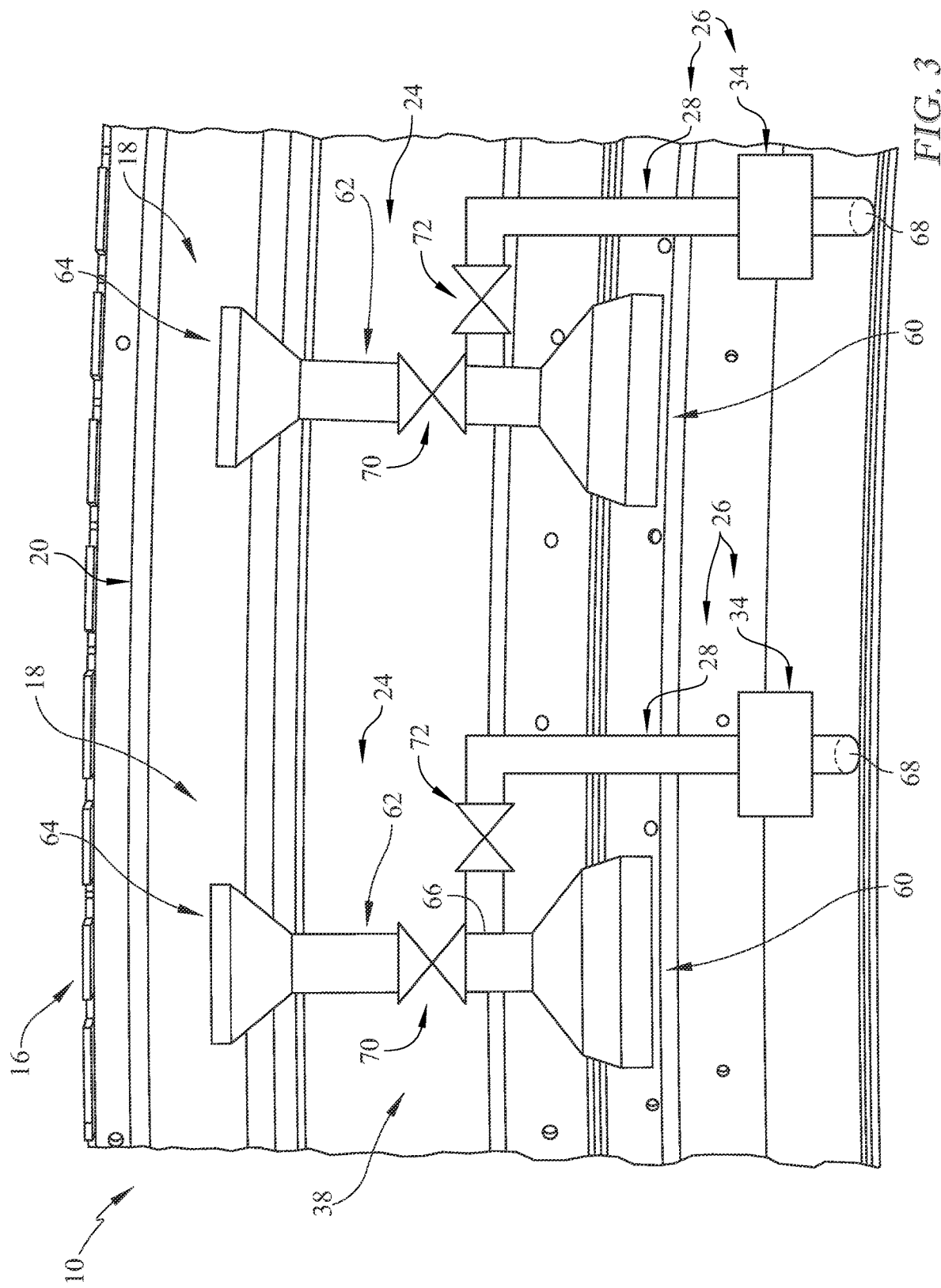
FIG. 3 is an elevation view of the fan case assembly of FIG. 2 looking radially inward from radially outward of the fan case assembly showing the air recirculation duct extends axially such that an extraction port of the air recirculation duct is circumferentially aligned with an injection port of the air recirculation duct, and further showing that the bleed air flow control system includes a first valve coupled with the air recirculation duct that selectively opens and closes to allow and block the portion of the air through the air recirculation duct and a second valve coupled with the cooling fluid passage that selectively opens and closes to allow and block the portion of the air through the cooling fluid passage to the heat exchanger.

The bleed air flow control system 18 includes an air recirculation duct 24 and a heat exchanger duct 26 as shown in FIGS. 2-4. The air recirculation duct 24 conducts the portion of the air 15 flowing through the gas path 25 at an aft end 32 of the fan track liner 22 into the gas path 25 axially forward of a forward end 30 of the fan track liner 22 for stall margin improvement. The heat exchanger duct 26 includes a cooling fluid passage 28 in fluid communication with the air recirculation duct 24 and a heat exchanger 34 in fluid communication with the cooling fluid passage 28. The cooling fluid passage 28 conducts the portion of the air 15 through the heat exchanger 34 to transfer heat from a fluid passing through the heat exchanger 34 to the portion of the air 15.

In the illustrative embodiment, the fan case assembly 10 includes a plurality of bleed air flow control systems 18 as shown in FIG. 3. The bleed air flow control systems 18 are spaced apart circumferentially about the central axis 11. A number of the bleed air flow control systems 18 may depend on the size of the engine 110, on the stall margin improvement the engine 110 may use, or on the amount of cooling the engine 110 may use. If the engine 110 has need for a greater stall margin improvement or a greater amount of cooling, the number of the bleed air flow control systems 18 may be increased and vice versa.

The bleed air flow control systems 18 are arranged radially outward of the annular case 20 to act as a cooling source without taking up additional space within a bypass duct of the gas turbine engine 110 as shown in FIG. 1. The bleed air flow control systems 18 are dual purpose depending on the needs of the gas turbine engine 110, such as improving stall margin or cooling fluid.

Turning again to the annular case 20 of the fan casing 16, the annular case 20 includes an outer wall 38, a hook 40, and a flange 42 as shown in FIGS. 2 and 4. In the illustrative embodiment, the annular case 20 is formed of metallic materials. The outer wall 38 extends circumferentially around the central axis 11 of the gas turbine engine 110. The hook 40 extends radially inward from the outer wall 38 to support the forward end 30 of the fan track liner 22. The flange 42 extends radially outward from the outer wall 38 axially aft of the hook 40. In the illustrative embodiment, the fan track liner 22 is coupled to the outer wall 38 near the aft end 32 of the fan track liner 22 with a fastener to support the aft end 32 of the fan track liner 22.

The fan track liner 22 is formed by a number of liner segments 22 in the illustrative embodiment. Each liner segment 22 includes the forward end 30, the aft end 32 spaced apart axially from the forward end 30, and inner and outer radial surfaces 44, 46 as shown in FIGS. 2 and 4. The inner and outer radial surfaces 44, 46 extend between the forward end 30 and the aft end 32. The inner radial surface 44 defines a portion of the gas path 25 of the gas turbine engine 110.

The fan casing 16 includes acoustic panels 48, 50 that are located forward and aft of the fan track liner 22 as shown in FIGS. 2 and 4. The acoustic panels 48, 50 define portions of the gas path 25 of the gas turbine engine 110 axially forward and aft of the fan track liner 22. The forward acoustic panel 48 is coupled to the annular case 20 axially forward of the fan track liner 22. The aft acoustic panel 50 is coupled to the annular case 20 axially aft of the fan track liner 22. In other embodiments, the fan track liner 22 may be bolted to the annular case 20 without the hook 40. In other embodiments, the fan track liner 22 may be coupled to the annular case 20 with adhesive.

The hook 40 of the annular case 20 includes a radially-extending portion 52, a forward flange 54, and an aft flange 56 as shown in FIG. 4. The radially-extending portion 52 extends radially inward from the outer wall 38 of the annular case 20. The forward flange 54 extends axially forward away from the radially-extending portion 52 at a location radially spaced apart from the outer wall 38. The aft flange 56 extends axially aft away from the radially-extending portion 52 at a location radially spaced apart from the outer wall 38. The forward flange 54 engages the forward acoustic panel 48 to support the forward acoustic panel 48, and the aft flange 56 engages the fan track liner 22 to support the fan track liner 22 as shown in FIG. 4.

The air recirculation duct 24 of the bleed air flow control system 18 includes an extraction port 60, a conduit 62, and an injection port 64 as shown in FIGS. 3 and 4. In some embodiments, the ports 60, 64 and the conduit 62 are integrally formed as a single, one-piece component. In other embodiments, the ports 60, 64 and the conduit 62 are individual components that are coupled together. Both the extraction port 60 and the injection port 64 are in fluid communication with the gas path 25 of the gas turbine engine 110, while the conduit 62 is in fluid communication with the extraction and injection ports 60, 64. The extraction port 60 extends radially through the outer wall 38 of the annular case 20 at a location axially aft of the aft end 32 of the fan track liner 22. The conduit 62 extends axially forward from the extraction port 60 toward the forward end 30 of the fan track liner 22 to the injection port 64. The injection port 64 extends radially inward from the conduit 62 through the outer wall 38 of the annular case 20 at a location axially forward of the forward end 30 of the fan track liner 22.

The conduit 62 is located radially outward of the outer wall 38 and the flange 42 of the annular case 20 as shown in FIGS. 2-4. A terminal end 42E of the flange 42 engages the conduit 62 to support the air recirculation duct 24 relative to the annular case 20. In the illustrative embodiment, the conduit 62 extends axially between the extraction and injection ports 60, 64 as shown in FIG. 3. The extraction port 60 is circumferentially aligned with the injection port 64 so that the conduit 62 extends in the axial direction relative to the central axis 11 of the gas turbine engine 110.

The extraction port 60 and the injection port 64 extend radially inward through the outer wall 38 of the annular case 20 and open into the gas path 25. In this way, a portion of the air 15 flowing through the gas path 25 is directed from the aft end 32 of the fan track liner 22 radially outward outside of the annular case 20, axially forward toward the forward end 30 of the fan track liner 22, and radially inward back into the gas path 25 axially forward of the forward end 30 of the fan track liner 22.

In the illustrative embodiment, the injection port 64 extends through the outer wall 38 of the annular case 20 axially forward of the forward flange 54 of the hook 40 as shown in FIG. 4. The injection port 64 extends through a portion of the acoustic panel 48. The extraction port 60 extends through the outer wall 38 axially aft of the flange 42. Illustratively, the extraction port 60 is located between the aft end 32 of the fan track liner 22 and a forward end of the acoustic panel 50. Reference is hereby made to U.S. Pat. No. 11,702,945 filed Dec. 22, 2021 and entitled TURBINE ENGINE FAN CASE WITH TIP INJECTION AIR RECIRCULATION PASSAGE for disclosure relating to the air recirculation duct, which application is hereby incorporated in its entirety herein.

The heat exchanger duct 26 includes the cooling fluid passage 28 and the heat exchanger 34 as shown in FIGS. 2-4. The cooling fluid passage 28 directs the portion of the air 15 from the conduit 62 of the air recirculation duct 24, through the heat exchanger 34, and into the gas path 25. The heat exchanger 34 transfers heat from the fluid flowing through the heat exchanger 34 to the portion of the air 15 to cool the fluid. The fluid may be oil, fuel, air, or any other suitable fluid.

The cooling fluid passage 28 includes an inlet 66 in fluid communication with the conduit 62 and an outlet 68 in fluid communication with the gas path 25 as shown in FIGS. 3 and 4. The inlet 66 receives the portion of the air 15 from the conduit 62, and the outlet 68 directs the portion of the air 15 into the gas path 25 after heat has been transferred to the portion of the air 15 in the heat exchanger 34. The outlet 68 extends radially through the outer wall 38 of the annular case 20 axially aft of the extraction port 60 of the air recirculation duct 24. Though shown as extending through the annular case 20, the outlet 68 may also extend radially inward aft of the annular case 20 such that the outlet 68 directs the portion of the air 15 aft of the annular case 20 into the bypass duct or an exhaust. The heat exchanger 34 is arranged along the cooling fluid passage 28 between the inlet 66 and the outlet 68.

The bleed air flow control system 18 is arranged radially outward of the outer wall 38 of the annular case 20 as shown in FIG. 3. The conduit 62 of the air recirculation duct 24 and the cooling fluid passage 28 are located radially outward of the outer wall 38 such that the portion of the air 15 flowing through the conduit 62 and the cooling fluid passage 28 is not exposed to an outer radial surface of the outer wall 38.

The bleed air flow control system 18 includes a first valve 70 and a second valve 72 as shown in FIGS. 2-4. The first valve 70 is coupled with the conduit 62 of the air recirculation duct 24 and is configured to selectively open and close to allow and block the portion of the air 15 through the conduit 62 to the gas path 25 forward of the forward end 30 of the fan track liner 22. The second valve 72 is coupled with the cooling fluid passage 28 and is configured to selectively open and close to allow and block the portion of the air 15 through the cooling fluid passage 28 to the heat exchanger 34. The inlet 66 of the cooling fluid passage 28 is fluidly connected with the conduit 62 of the air recirculation duct 24 upstream of the first valve 70. Thus, if the first valve 70 is in a closed position, the portion of the air 15 may be directed into the cooling fluid passage 28 if the second valve 72 is open. The second valve 72 is arranged on the cooling fluid passage 28 upstream of the heat exchanger 34. If the second valve 72 is in a closed position, the portion of the air 15 is not directed through the heat exchanger 34. Illustratively, the first valve 70 and the second valve 72 are two-way valves, such as, but not limited to, ball valves, gate valves, globe valves, or butterfly valves.

The bleed air flow control system 18 includes a control system 74 as shown in FIGS. 2 and 4. The control system 74 operates in different modes by selectively opening and closing the valves 70, 72. The control system 74 may operate in different modes depending on an operating condition of the gas turbine engine 110, maneuvers of an aircraft having the gas turbine engine 110, sensor input, and combinations of the same. In response to a first signal, the control system 74 operates in a first mode in which the first valve 70 is open and the second valve 72 is closed. In the first mode, the portion of the air 15 is directed axially forward through the conduit 62 toward the injection port 64 without being directed toward the heat exchanger 34. In response to a second signal, the control system 74 operates in a second mode in which the second valve 72 is open and the first valve 70 is closed. In the second mode, the portion of the air 15 is directed through the inlet 66 of the cooling fluid passage 28 and through the heat exchanger 34 without being directed through the injection port 64 of the air recirculation duct 24. In response to a third signal, the control system 74 operates in a third mode in which the valves 70, 72 are both open so that the portion of the air 15 is directed toward the forward end 30 of the fan track liner 22 and through the heat exchanger 34. In response to a fourth signal, the control system 74 operates in a fourth mode in which the valves 70, 72 are both closed so that the portion of the air 15 is not directed toward the forward end 30 of the fan track liner 22 or through the heat exchanger 34. For example, in the fourth mode, all the valves of the bleed air flow control system 18, including valves 70, 72, are closed to allow the engine 110 to operate at maximum efficiency to maximize aircraft range. The valves, including valves 70, 72, are all closed in response to no stall margin or cooling needs. There may be any number of modes that the control system 74 operates in.

In some embodiments, the control system 74 operates in a particular mode based on an operating condition of the gas turbine engine 110. The operating conditions may include at least one of take-off, climb, cruise, descent, and landing of an aircraft having the gas turbine engine 110. The control system 74 may also operate in a particular mode based on a maneuver of an aircraft having the gas turbine engine 110, such as, but not limited to, banks, turns, or rolls. In each of these operating conditions and/or maneuvers, a greater stall margin improvement or a greater amount of cooling may be useful to the gas turbine engine 110. For example, maximum thrust may be needed at take-off and more stall margin may be needed during maneuvers. In straight and level cruise, adequate thrust margin and adequate stall margin may be needed. The control system 74 may be optimized to cool hot systems (via the heat exchanger duct 26) while thrust or stall margin are not limiting. Tip injection (via the air recirculation duct 24) may be used momentarily during maneuvers. As previously described, the fan case assembly 10 includes the plurality of bleed air flow control systems 18 as shown in FIG. 3. The control system 74 may selectively operate each of the bleed air flow control systems 18 together or may operate each of the bleed air flow control systems 18 individually.

In some embodiments, the control system 74 operates in different modes by selectively opening and closing the valves 70, 72 depending on sensor input from at least one sensor 78 included in the control system 74. The at least one sensor 78 is configured to measure one of temperature, pressure, air speed, altitude, blade tip timing, blade rotational speed, attitude or aircraft orientation, and acceleration. The at least one sensor 78 is configured to detect distortion, fan stall, and/or other aeromechanical issues. The control system 74 receives a measurement from the at least one sensor 78 or sensors 78 and directs the valves 70, 72 to open or close in response to the measurement.

For example, the control system 74 may be configured to direct the first valve 70 to close when the measurements from the sensor(s) 78 are within a predetermined threshold and, thus, not indicative of any necessary stall margin improvement. Then, when the measurements from the sensor(s) 78 are outside of the predetermined threshold, the control system 74 directs the first valve 70 to open and the second valve 72 to close to direct the portion of the air 15 into the gas path 25 forward of the forward end 30 of the fan track liner 22 for tip injection and stall margin improvement. In some embodiments, the control system 74 is configured to use the measurements from the sensor(s) 78 to anticipate aircraft maneuvers.

As another example, the control system 74 may be configured to direct the first valve 70 to close and the second valve 72 to open when temperature measurements from the sensor(s) 78 are above a predetermined threshold. If the sensor(s) 78 detect that a temperature of fluid within a fluid system is greater than the predetermined temperature threshold, the second valve 72 is opened so that the fluid may be cooled by the portion of the air 15 directed through the heat exchanger 34.

The sensor(s) 78 may include one of or a combination of dynamic sensors, static wall pressure sensors, altitude sensors, sensors configured to detect the angle of attack of the plurality of fan blades 14, sensors configured to detect the tip timing of the plurality of fan blades 14, and air speed sensors. In some embodiments, the sensor(s) 78 may be a dynamic pressure transducer. The sensor(s) 78 may also be a sensor configured to measure a rotational speed of the fan blades 14, which could be used along with an additional sensor that is a dynamic pressure transducer. In some embodiments, the sensor(s) 78 may be a sensor configured to measure a rotation speed of another section of the engine 110.

The control system 74 uses the operating condition of the engine 110, maneuvers of the aircraft having the engine 110, and/or sensor input to maintain optimal performance of the bleed air flow control system 18. The bleed air flow control system 18 is operated by the control system 74 to provide tip injection to extend stall capacity as needed and to increase cooling capacity as needed.

Figure 5:
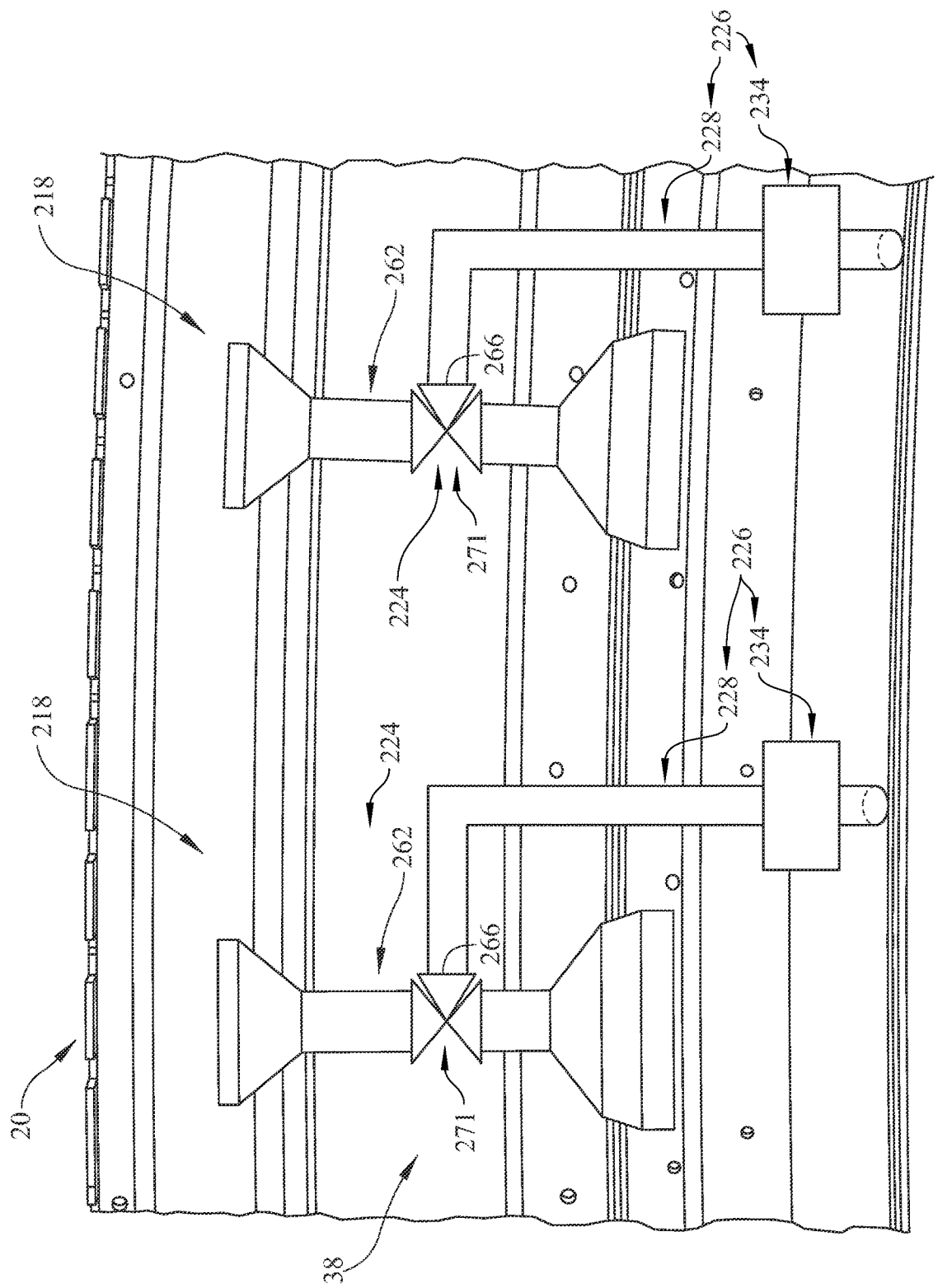
FIG. 5 is another embodiment of a bleed air flow control system for use in the gas turbine engine of FIG. 1 showing that the bleed air flow control system includes a three-way valve coupled with an air recirculation duct and a cooling fluid passage that is configured to selectively allow and block the portion of the air through the air recirculation duct to the gas path and through the cooling fluid passage to a heat exchanger.

Another embodiment of a bleed air flow control system 218 in accordance with the present disclosure is shown in FIG. 5. The bleed air flow control system 218 is substantially similar to the bleed air flow control system 18 shown in FIGS. 1-4 and described herein. Accordingly, similar reference numbers in the 200 series indicate features that are common between the bleed air flow control system 218 and the bleed air flow control system 18. The description of the bleed air flow control system 18 is incorporated by reference to apply to the bleed air flow control system 218, except in instances when it conflicts with the specific description and the drawings of the bleed air flow control system 218.

The bleed air flow control system 218 includes a three-way valve 271 coupled with a conduit 262 of an air recirculation duct 224 and with a cooling fluid passage 228 of a heat exchanger duct 226 as shown in FIG. 5. The valve 271 is configured to selectively change positions to allow and block the portion of the air through the conduit 262 to the gas path forward of the forward end of the fan track liner and to allow and block the portion of the air through the cooling fluid passage 228 to a heat exchanger 234. An inlet 266 of the cooling fluid passage 228 is fluidly connected with the conduit 262 through the valve 271. Illustratively, the valve 271 may be a ball valve, a globe valve, a butterfly valve, or any other suitable valve.

Figure 6:
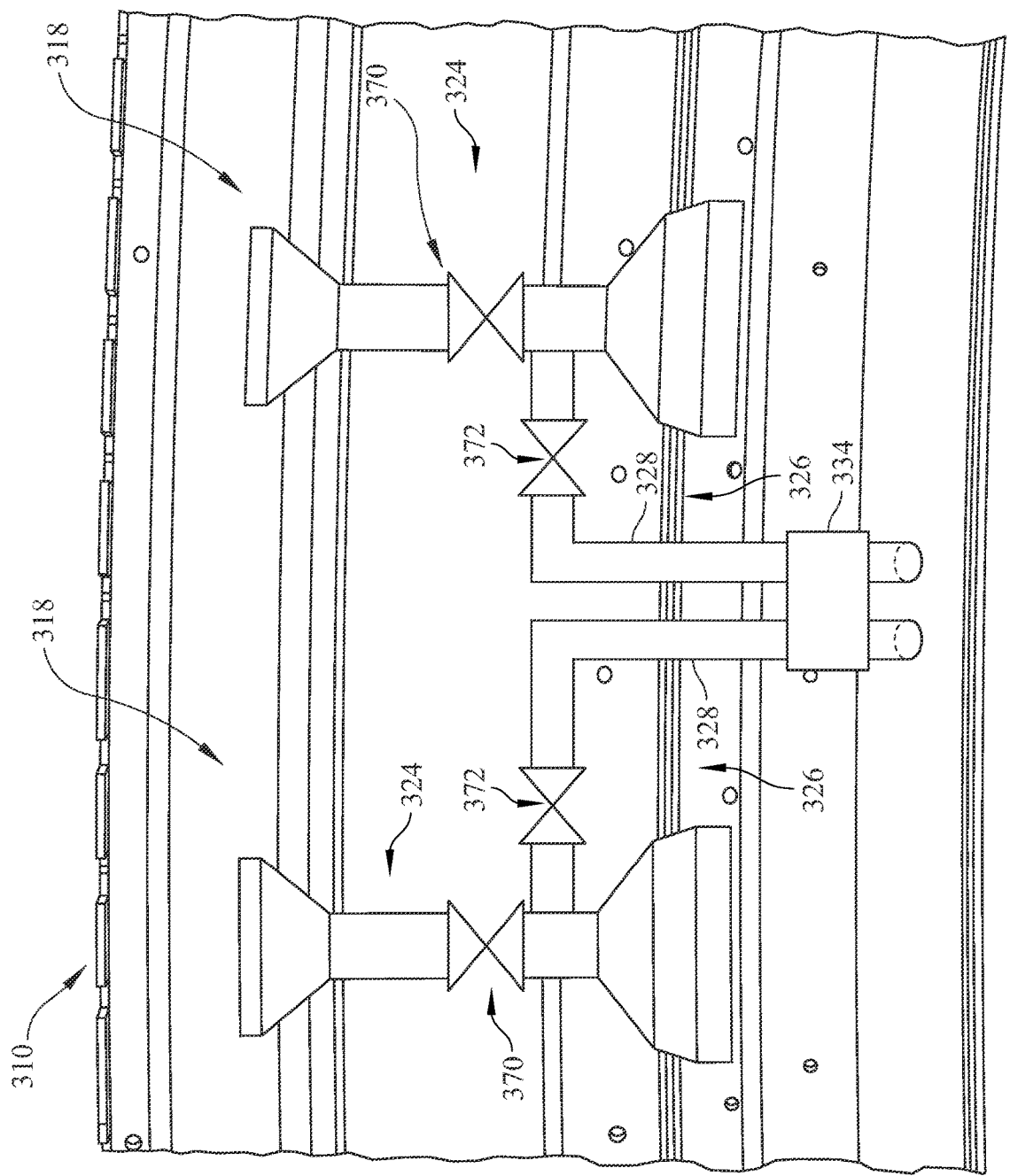
FIG. 6 is another embodiment of a fan case assembly for use in the gas turbine engine of FIG. 1 showing that two cooling fluid passages of two bleed air flow control systems are circumferentially spaced apart from one another and each cooling fluid passage is fluidly connected to a heat exchanger so that the heat exchanger receives the portion of the air from two different air recirculation ducts.

Another embodiment of a fan case assembly 310 in accordance with the present disclosure is shown in FIG. 6. The fan case assembly 310 is substantially similar to the fan case assembly 10 shown in FIGS. 1-4 and described herein. Accordingly, similar reference numbers in the 300 series indicate features that are common between the fan case assembly 310 and the fan case assembly 10. The description of the fan case assembly 10 is incorporated by reference to apply to the fan case assembly 310, except in instances when it conflicts with the specific description and the drawings of the fan case assembly 310.

The fan case assembly 310 includes a plurality of bleed air flow control systems 318. Each bleed air flow control system 318 includes an air recirculation duct 324 and a heat exchanger duct 326 as shown in FIG. 6. The air recirculation duct 324 conducts the portion of the air flowing through the gas path at the aft end of the fan track liner into the gas path axially forward of the forward end of the fan track liner. The heat exchanger duct 326 includes a cooling fluid passage 328 in fluid communication with the air recirculation duct 324. The cooling fluid passages 328 of two adjacent heat exchanger ducts 326 are each fluidly connected with the same heat exchanger 334 as shown in FIG. 6. The portion of the air from each of the cooling fluid passages 328 is directed through the heat exchanger 334 to transfer heat to the portion of the air flowing through the heat exchanger 334. As compared to the bleed air flow control system 18, adjacent bleed air flow control systems 318 direct the portion of the air toward the same heat exchanger 334 instead of each bleed air flow control system directing the portion of the air toward a separate heat exchanger.

Each bleed air flow control system 318 includes a first valve 370 and a second valve 372 as shown in FIG. 6. A control system operates in different modes by selectively opening and closing the valves 370, 372 depending on an operating condition of the gas turbine engine 110. In one mode, each second valve 372 may be open such that the portion of the air from each air recirculation duct 324 is directed toward the heat exchanger 334. In another mode, one of the second valves 372 may be open while the other is closed such that the portion of the air is only directed toward the heat exchanger 334 from one air recirculation duct 324.

A method of assembling and using the fan case assembly 10, 310 may include several steps. The method includes providing a fan casing 16 that defines a gas path 25. The fan casing 16 includes the annular case 20 that extends around the central axis 11 and the fan track liner 22 coupled with the annular case 20. The method includes arranging the bleed air flow control system 18, 218, 318 radially outward of the annular case 20. The bleed air flow control system 18, 218, 318 includes the air recirculation duct 24, 224, 324, the cooling fluid passage 28, 228, 328, and the heat exchanger 34, 234, 334.

The method includes extending the extraction port 60 of the air recirculation duct 24, 224, 324 radially inward through the outer wall 38 of the annular case 20 axially aft of the aft end 32 of the fan track liner 22. The method includes extending the injection port 64 of the air recirculation duct 24, 224, 324 radially inward through the outer wall 38 of the annular case 20 axially forward of the forward end 30 of the fan track liner 22. The method includes coupling the inlet 66, 266 of the cooling fluid passage 28, 228, 328 with the air recirculation duct 24, 224, 324. The method includes coupling the heat exchanger 34, 234, 334 with the cooling fluid passage 28, 228, 328 so that the heat exchanger 34, 234, 334 and the cooling fluid passage 28, 228, 328 are in fluid communication with one another. The method includes extending the outlet 68 of the cooling fluid passage 28, 228, 328 radially inward through the outer wall 38 of the annular case 20 axially aft of the extraction port 60 of the air recirculation duct 24, 224, 324.

The method includes, in response to a first operating condition, opening the first valve 70, 370 coupled with the air recirculation duct 24, 324, closing the second valve 72, 372 coupled with the cooling fluid passage 28, 328, and flowing the portion of the air 15 from the gas path 25 through the air recirculation duct 24, 324 from the extraction port 60 to the injection port 64. The method includes, in response to a second operating condition, closing the first valve 70, 370, opening the second valve 72, 372, and flowing the portion of the air 15 through the cooling fluid passage 28, 328 and through the heat exchanger 34, 334.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan case assembly adapted for use with a gas turbine engine, the fan case assembly comprising:
   a fan casing configured to be arranged around fan blades and define a gas path through the fan case assembly, the fan casing includes a metallic annular case that extends circumferentially about a central axis and a fan track liner coupled with the metallic annular case and configured to interface with the fan blades, the fan track liner including a forward end, an aft end spaced apart axially from the forward end, and an inner radial surface that extends between the forward end and the aft end to define an outer boundary of the gas path, and
   a bleed air flow control system configured to bleed selectively a portion of air flowing through the gas path for use as a cooling source in the fan case assembly, the bleed air flow control system including an air recirculation duct and a heat exchanger duct, the air recirculation duct conducts the portion of the air from the gas path at the aft end of the fan track liner and directs the portion of the air into the gas path at the forward end of the fan track liner, and the heat exchanger duct includes a cooling fluid passage in fluid communication with the air recirculation duct and a heat exchanger in fluid communication with the cooling fluid passage,
   wherein the cooling fluid passage is configured to conduct the portion of the air through the heat exchanger to transmit heat from the heat exchanger to the portion of the air and to direct the portion of the air into the gas path after conducting the portion of the air through the heat exchanger,
   wherein the air recirculation duct and the heat exchanger duct are located radially outward of an outer wall of the metallic annular case.

2. The fan case assembly of claim 1, wherein, in a first mode, the bleed air flow control system directs the portion of the air into the gas path axially forward of the forward end of the fan track liner without directing the portion of the air through the heat exchanger and, in a second mode, the bleed air flow control system directs the portion of the air through the heat exchanger without directing the portion of the air into the gas path axially forward of the forward end of the fan track liner.

3. The fan case assembly of claim 2, wherein the bleed air flow control system includes a controller configured to operate the bleed air flow control system in the first mode or in the second mode depending on an operating condition of the gas turbine engine.

4. The fan case assembly of claim 1, wherein the air recirculation duct includes an extraction port in fluid communication with the gas path aft of the aft end of the fan track liner and an injection port in fluid communication with the gas path forward of the forward end of the fan track liner, and wherein the cooling fluid passage of the heat exchanger duct includes an inlet in fluid communication with the air recirculation duct to receive the portion of the air therefrom and an outlet in fluid communication with the gas path aft of the extraction port of the air recirculation duct.

5. The fan case assembly of claim 4, wherein the extraction port extends radially through the annular case at a location axially aft of the aft end of the fan track liner, the air recirculation duct extends axially forward from the extraction port toward the forward end of the fan track liner and the injection port extends radially inward from the air recirculation duct through the annular case at a location axially forward of the forward end of the fan track liner.

6. The fan case assembly of claim 1, wherein the bleed air flow control system includes a first valve coupled with the air recirculation duct and configured to selectively open and close to allow and block the portion of the air through the air recirculation duct to the gas path forward of the forward end of the fan track liner.

7. The fan case assembly of claim 6, wherein the bleed air flow control system includes a second valve coupled with the cooling fluid passage and configured to selectively open and close to allow and block the portion of the air through the cooling fluid passage to the heat exchanger.

8. The fan case assembly of claim 1, wherein the bleed air flow control system includes a second air recirculation duct and a second cooling fluid passage, the second air recirculation duct is circumferentially spaced apart from the air recirculation duct and the second cooling fluid passage is in fluid communication with each of the second air recirculation duct and the heat exchanger to transmit another portion of air from the gas path to the heat exchanger.

9. The fan case assembly of claim 1, wherein the bleed air flow control system includes a three-way valve coupled with the air recirculation duct and the cooling fluid passage and configured to selectively allow and block the portion of the air through the air recirculation duct to the gas path and through the cooling fluid passage to the heat exchanger.

10. A fan case assembly adapted for use with a gas turbine engine, the fan case assembly comprising:
  a fan casing that defines a gas path through the fan case assembly, the fan casing includes an annular case that extends circumferentially about a central axis and a fan track liner coupled with the annular case, the fan track liner including a forward end and an aft end spaced apart axially from the forward end, and
  a bleed air flow control system configured to bleed selectively a portion of air flowing through the gas path, the bleed air flow control system including an air recirculation duct and a heat exchanger duct, the air recirculation duct conducts the portion of the air from the gas path at the aft end of the fan track liner and directs the portion of the air directly into the gas path at the forward end of the fan track liner axially forward of a forwardmost airfoil arranged in the fan casing, and the heat exchanger duct includes a cooling fluid passage in fluid communication with the air recirculation duct to receive the portion of the air therefrom and a heat exchanger in fluid communication with the cooling fluid passage, and
  wherein the air recirculation duct and the heat exchanger duct are located radially outward of an outer wall of the annular case.

11. The fan case assembly of claim 10, wherein, in a first mode, the bleed air flow control system directs the portion of the air into the gas path axially forward of the forward end of the fan track liner without directing the portion of the air through the heat exchanger and, in a second mode, the bleed air flow control system directs the portion of the air through the heat exchanger without directing the portion of the air into the gas path axially forward of the forward end of the fan track liner.

12. The fan case assembly of claim 11, wherein the bleed air flow control system includes a controller configured to operate the bleed air flow control system in the first mode or in the second mode depending on an operating condition of the gas turbine engine.

13. The fan case assembly of claim 12, wherein the controller is configured to operate the bleed air flow control system in the first mode in response to the operating condition of the gas turbine engine being indicative of stall.

14. The fan case assembly of claim 10, wherein the air recirculation duct includes an extraction port in fluid communication with the gas path aft of the aft end of the fan track liner and an injection port in fluid communication with the gas path forward of the forward end of the fan track liner, and wherein the cooling fluid passage of the heat exchanger duct includes an inlet in fluid communication with the air recirculation duct to receive the portion of the air therefrom and an outlet in fluid communication with the gas path aft of the extraction port of the air recirculation duct.

15. The fan case assembly of claim 10, wherein the bleed air flow control system includes a first valve coupled with the air recirculation duct and a second valve coupled with the cooling fluid passage, the first valve is configured to selectively open and close to allow and block the portion of the air through the air recirculation duct to the gas path forward of the forward end of the fan track liner and the second valve is configured to selectively open and close to allow and block the portion of the air through the cooling fluid passage to the heat exchanger.

16. The fan case assembly of claim 10, wherein the bleed air flow control system includes a three-way valve coupled with the air recirculation duct and the cooling fluid passage and configured to selectively allow and block the portion of the air through the air recirculation duct to the gas path and through the cooling fluid passage to the heat exchanger.

17. A method comprising:
  providing a fan casing that defines a gas path, the fan casing including an annular case that extends around a central axis and a fan track liner coupled with the annular case,
  arranging a bleed air flow control system radially outward of the annular case, the bleed air flow control system including an air recirculation duct, a cooling fluid passage, and a heat exchanger,
  extending an extraction port of the air recirculation duct radially inward through an outer wall of the annular case axially aft of an aft end of the fan track liner,
  extending an injection port of the air recirculation duct radially inward through the outer wall of the annular case axially forward of a forward end of the fan track liner,
  coupling an inlet of the cooling fluid passage with the air recirculation duct,
  coupling the heat exchanger with the cooling fluid passage so that the heat exchanger and the cooling fluid passage are in fluid communication with one another, and
  extending an outlet of the cooling fluid passage radially inward through the outer wall of the annular case axially aft of the extraction port of the air recirculation duct.

18. The method of claim 17, further comprising, in response to a first operating condition, opening a first valve coupled with the air recirculation duct, closing a second valve coupled with the cooling fluid passage, and flowing a portion of air from the gas path through the air recirculation duct from the extraction port to the injection port.

19. The method of claim 18, further comprising, in response to a second operating condition, closing the first valve, opening the second valve, and flowing the portion of the air through the cooling fluid passage to the heat exchanger.

* * * * *